United States Patent [19]
Hobbs

[11] Patent Number: 5,244,615
[45] Date of Patent: Sep. 14, 1993

[54] PROCESS FOR THE PRODUCTION OF PERMEATION RESISTANT CONTAINERS

[75] Inventor: John P. Hobbs, Lansdale, Pa.

[73] Assignee: Air Products and Chemicals, Inc., Allentown, Pa.

[21] Appl. No.: 985,665

[22] Filed: Dec. 3, 1992

[51] Int. Cl.$^5$ .................. B29C 49/18; B29C 49/46
[52] U.S. Cl. .................................. 264/83; 264/85; 264/526; 264/529
[58] Field of Search ............... 264/83, 85, 523, 526, 264/528, 37, 529

[56] References Cited

U.S. PATENT DOCUMENTS

| | | | |
|---|---|---|---|
| 2,811,468 | 10/1957 | Joffre | 117/95 |
| 3,862,284 | 1/1975 | Dixon et al. | 264/83 |
| 4,142,032 | 2/1979 | D'Angelo | 526/43 |
| 4,264,750 | 4/1981 | Anand et al. | 525/356 |
| 4,394,333 | 7/1983 | Fukushima et al. | 264/83 |
| 4,404,256 | 9/1983 | Anand et al. | 428/409 |
| 4,593,050 | 6/1986 | Cohen et al. | 522/2 |
| 4,617,077 | 10/1986 | Giese et al. | 156/245 |
| 4,701,290 | 10/1987 | Eschwey et al. | 265/40.1 |
| 4,830,810 | 5/1989 | Ufer et al. | 264/40.1 |
| 4,869,859 | 9/1989 | Eschwey et al. | 264/83 |
| 4,880,675 | 11/1989 | Mehta | 264/83 |

FOREIGN PATENT DOCUMENTS

| | | | |
|---|---|---|---|
| 3535602 | 4/1987 | Fed. Rep. of Germany | 264/83 |
| 61-230919 | 10/1986 | Japan | 264/83 |

*Primary Examiner*—Catherine Timm
*Attorney, Agent, or Firm*—Russell L. Brewer; James C. Simmons; William F. Marsh

[57] ABSTRACT

A multi-step blow molding process for producing fuel containers having excellent resistance to permeation by hydrocarbon fuels and organic fuel additives such as lower alkanols and ethers. In blow molding, a parison is formed from a thermoplastic material, expanded within a closed mold by means of an inflating gas for conforming the parison to the shape of the mold and fluorinated under conditions sufficient to effect surface fluorination of the interior of the parison. The parison is evacuated and the article recovered. The improvement in the blow molding operation comprises pressurizing the parison with a reactive fluorine containing gas containing from 0.1 to 1% fluorine by volume while the parison is at a temperature above its self supporting temperature and for a time sufficient to effect fluorination of the interior surface of the parison. Subsequently, the interior surface of the pre-fluorinated parison is pressurized with a reactive fluorine containing gas containing at least twice the initial concentration but not less than about 1% fluorine by volume for a time, typically from about 2 to 30 seconds to form said fluorinated parison having reduced permeability.

18 Claims, No Drawings

PROCESS FOR THE PRODUCTION OF PERMEATION RESISTANT CONTAINERS

FIELD OF THE INVENTION

This invention pertains to a process for the fluorination of polymeric materials, e.g. polyethylene, to produce containers resistant to permeation by hydrocarbons, polar liquids and mixtures of hydrocarbons and polar liquids.

BACKGROUND OF THE INVENTION

Fluorination of polyethylene and other polymeric materials to improve their resistance to solvents and to vapor permeation has long been practiced. Early work was reported by Joffre in U.S. Pat. No. 2,811,468 and Dixon et al. in U.S. Pat. No. 3,862,284. The '468 patent showed the early room temperature fluorination of polyethylene materials to improve the barrier properties thus enhancing the material as a wrapping material for foodstuffs and perishable materials and for the generation of containers via a blow molding operation utilizing a reactive fluorine containing gas for conforming the shape of the molten polyethylene parison to the mold. Joffre carried out fluorination of polyethylene film and of container walls in chambers by contacting the polyethylene surface with a fluorine containing gas at room temperature for a period of about 20 to 150 minutes to achieve fluorine concentrations of 0.03 to 3.5 percent by weight of fluorine based on the weight of the polyethylene.

Dixon et al., in '284 disclosed fluorination of a variety of polymeric materials in blow molding operations to enhance their barrier properties. A treatment gas containing from about 0.1 to 10% by volume of fluorine in an inert gas was injected into the parison and inflated or expanded into shape utilizing the reactive gas. Due to the higher temperature, a blowing time of approximately 5 seconds was utilized at which time the parison was cooled and the reactive gas and container recovered.

Commercially fuel tanks having enhanced resistance to hydrocarbon permeation have been marketed under the Airopak trademark wherein the fuel tanks were produced utilizing blow molding techniques. In these processes the parison is initially conformed to the desired shape by inflating or expanding with an inert gas, followed by evacuation of the parison and subsequent injection of the parison with a reactive gas containing from 0.1 to 10% fluorine. The reactive gas is removed from the parison, recovered and the container ejected from the mold.

There have been substantial modifications to the early processes for the production of containers having enhanced barrier properties via blow molding. Some of these processes are described in the following patents, they are:

U.S. Pat. No. 4,142,032 discloses an apparent improvement in the Dixon et al., process utilizing a reactive gas containing both fluorine and a reactive bromine source at temperatures below the softening point of the polymer and pressures one atmosphere or less. Basically, then, the '032 process is similar to that of Joffre '468 in that the fluorination is effected at low temperature, thus requiring long reaction times.

U.S. Pat. Nos. 4,404,256; 4,264,750; and 4,593,050 disclose a low temperature fluorination of polyolefins, e.g. polyethylene and polypropylene, to form low energy surfaces utilizing wave energy in association with the fluorination process. The '256 and '750 patents disclose contacting the polymer surface with ions or radicals comprising fluorine or fluorinated carbon as a cold plasma. The '050 discloses fluorination of polymer surfaces utilizing a fluorinating gas and enhancing the fluorination by exposing the surface to ultraviolet radiation to assist in the fluorination process.

U.S. Pat. No. 4,701,290 discloses the production of high density polyethylene fuel tanks having increased barrier resistance to hydrocarbon vapor permeation via off-line-fluorination. The key to enhancing barrier permeation resistance lies in the precise control of fluorination of the polyethylene fuel tank and this is achieved by passing the treatment gas through a container filled with aluminum oxide. By measuring the quantity of oxygen generated from the $Al_2O_3$, one controls the concentration of fluorine contained in the treatment gas and thereby controls the level of fluorine acting upon the surface of the container within a predefined reaction time.

Improvements in blow molding processes have also been made since the discovery of the Dixon, et al. higher temperature blow molding process and these are reported in U.S. Pat. Nos. 4,830,810; 4,617,077 and 4,869,859. The '810 patent discloses a blow molding process for producing containers comprising inserting the preform or parison into the mold, injecting inert gas into the parison at a first level of pressure to expand and conform it to the shape of the mold, raising the pressure to a level above the first level by injecting a fluorine containing reactant gas into the parison after pressure tightness has been determined. The reactant gas typically comprises a mixture of fluorine and nitrogen with the fluorine concentration being about 1% by volume; the injection pressures are from 4 to about 10 bar and reaction times of about 30 seconds. The process eliminates some of the hazards associated with blow molding using a reactive gas to conform the parison to the mold since pressure tightness at the time of injection of the reaction gas may not have been established. The '077 patent modifies the '810 process in that inflation of the parison in the mold with an inert gas is conducted at high pressure followed by treatment of the interior of the parison with a fluorine containing gas at substantially lower pressure than that used for initially expanding the parison or preform. After reaction, the reaction gas is replaced with a flushing and cooling gas at a pressure substantially higher than the pressure of the reaction gas and even higher than the initial injection gas used to preform the parison.

U.S. Pat. No. 4,869,859 discloses a blow molding process for the preparation of high density polyolefin fuel tanks. The patentees indicate that severe wrinkling of the thermoplastic occurs at temperatures close to or above the melting point. Fluorination is carried out at temperatures from 50° to 130° C., preferably 80° to 120° C., and below the molding temperature, in an effort to achieve uniform temperature distribution and fluorination of the interior surface of the material.

SUMMARY OF THE INVENTION

This invention relates to an improved in-line multistep fluorination process for the blow molding of thermoplastic containers such as fuel containers and bottles which have enhanced barrier properties. The fuel tank containers have enhanced barrier properties with respect to vapor permeation by hydrocarbons, polar liquids, and hydrocarbon fuels containing polar liquids such as alcohols, ethers, amines, carboxylic acids, ketones, etc. In the basic process for the production of blow molded thermoplastic articles via in-line fluorination wherein a parison of thermoplastic material is formed, expanded within a closed mold by means of a gas for conforming the parison to the shape of the mold, fluorinated under conditions sufficient to effect surface fluorination of the interior of said parison and then evacuating the parison, purging, and recovering the parison from the mold. The improvement resides in the multi-stage fluorination of the parison comprising the steps:

effecting a fluorination of the surface of the parison by contacting the parison with a reactant gas comprising a reactive fluorine containing gas containing from about 0.1 to 1% fluorine by volume while the thermoplastic is at a temperature above its self-supporting temperature for a time sufficient to effect fluorination of the surface of the parison; and then, contacting the initial fluorinated surface of the parison while at an elevated temperature with a reactive fluorine containing gas having a fluorine concentration of at least twice that used in the initial fluorination but such fluorine concentration in said gas being not less than about 1%.

There are several advantages associated with the in-line multi-step fluorination process to produce containers having improved barrier properties, and these include:

the ability to form permeation resistant containers having enhanced barrier properties, particularly with respect to hydrocarbons, polar liquids and hydrocarbons containing polar liquids such as alcohols, ethers, amines, carboxylic acids, ketones, etc.;

the ability to produce permeation resistant containers via an in-line blow molding process while achieving fluorination at commercial production rates;

the ability to produce high density polyethylene fuel containers particularly suited for the automotive industry, such containers having reduced permeation associated with hydrocarbon fuels blended with lower alcohols such as methanol, ethanol, ethers such as methyl tertiary butyl ether, ketones, etc.; and the ability to produce thin-walled containers having excellent permeation resistance.

DETAILED DESCRIPTION OF THE INVENTION

Automotive standards regarding vapor permeation rates associated with hydrocarbon fuels and particularly hydrocarbon fuels containing minor portions of lower alkanols have been established for some times. Fuel tanks constructed of fluorinated high density polyethylene and produced via in-line fluorination processes meet current environmental emission requirements from the automobile manufacturers. However, such fuel containers do not meet the proposed environmental emission requirements, particularly when those hydrocarbon fuels are blended with polar liquids such as lower alkanols, e.g., methanol, ethanol, ethers such as methyl tertiary butyl ether, ketones, amines and other fuel additives. The California Air Resources Board (CARB) has proposed regulations suggesting that a final permeation rate of less than 0.2 g/day would be desirable for future fuel tanks.

Blow molding of thermoplastic materials to produce containers of various sizes, wall thicknesses and shapes is well known. Thermoplastic material such as polymers and copolymers of polystyrene, polyacrylonitrile, polyvinylchloride and particularly polyolefins such as low density and high density polyethylene and polypropylene often are used in producing containers and they can be treated via in-line fluorination to enhance their barrier properties in accordance with this process. The process is particularly adapted for the fluorination of thick-walled containers, e.g., 3 millimeters (mm) and greater, typically 3 to about 6 mm high density polyethylene for the fabrication of fuel tanks for the automotive industry and thin-walled, e.g., 2 mm and less wall thickness, bottle-type containers.

In a typical blow molding process for producing hollow articles or containers, a thermoplastic is heated to a temperature above its softening point, formed into a parison and injected into a mold. The parison is inflated or expanded in its softened or molten state via sufficient pressurization with a gas to conform the parison to the contour of the mold. In many processes, fluorine-containing gases initially are used to inflate and conform the parison to the contour of the mold. However, releases may occur during the initial pressurization of the parisons, particularly thick-walled containers such as fuel tanks and cause a release of fluorine and contaminate the workplace. In recent years, the parison initially is conformed to the mold via pressurization with a substantially inert gas, e.g. nitrogen, helium, or argon, to ensure that a seal is formed, then fluorinated in an effort to reduce environmental contamination and occupational hazards.

Although fuel tanks constructed via the above described in-line fluorination process have provided acceptable barrier to permeation by hydrocarbon solvents and meet current environmental emission requirements, the in-line processes have not produced containers having acceptable barrier resistance to permeation by hydrocarbon solvents containing polar liquids to meet future environmental emission requirements. Thin-walled products such as bottles also are noted to have high permeation rates and greater barrier resistance is required.

In the conceptual development of the invention it was postulated that surface damage in the form of "molecular pinholes", if you will, which rendered the container permeable to alcohols, ethers, and other organic fuel additives, were being generated in prior art processes by the high temperature reaction of fluorine with the polymer at its surface. The key to reducing permeation was visualized as controlling the level of $CF_x$ sites at the surface of the polymer, these sites indicating a high degree of reaction and high localized temperatures during the initial contact with the reactant gases. The high localized temperature lead to the formation of molecular pinholes at the surface of the container thereby leading to excessive permeation. Barrier properties were believed to be relatively independent of fluorine concentration in the polymer. The development, had as its objective, the modification of fluorination processes for effecting reduction and elimination of the molecular pinholes from the surface of the container while at the same time effecting fluorination of the container at levels sufficient to provide the necessary and desired physical properties for fuel containers and bottles, e.g., abrasion and solvent permeation resistance, etc.

An in-line, multi-step process for fluorinating fuel tanks and thin-walled bottle type polymer containers was considered the viable way to produce containers having an acceptable barrier to hydrocarbon solvents containing polar liquids as well as to meet future environmental emission requirements. The in-line, multi-step fluorination process would require carefully controlling the polymer temperature, concentration of fluorine in the reactant gas used during fluorination and the contact time of fluorination. The parison initially would be contacted with an initial reactant gas containing a low concentration of fluorine, the balance thereof being inert under the reaction conditions, at a temperature above the self-supporting temperature of the thermoplastic and for a time sufficient to effect surface fluorination. The self-supporting temperature here is defined as the temperature at which the parison or container will collapse if removed from the mold. If a reactant gas having a high concentration of fluorine were used to contact the polymer initially while it is at a temperature above the self-supporting temperature of the polymer, damage at the polymer surface may occur thereby reducing its barrier properties.

The pre-fluorinated parison then would be contacted with a reactant gas containing a relatively high concentration of fluorine in subsequent steps. The pre-fluorinated polymer may be at a temperature above the self-supporting temperature of the polymer, but then cooled to a temperature below the self-supporting temperature, but elevated. The exposure of a pre-fluorinated parison to an ambient temperature reactant gas containing a substantially higher concentration of fluorine than used initially would cause further fluorination of the polymer without causing damage to the polymer surface. Excessive localized heating would be reduced since many of the available reactive sites would have reacted with fluorine in the initial treatment and because the surface temperature of the pre-fluorinated parison would have been reduced on contact with the ambient temperature gas.

The in-line, multi-step fluorination process of the present invention therefore proposes to utilize an extremely dilute fluorine-containing gas, e.g., generally not greater than about 1%, preferably not greater than about 0.7% and most preferably not greater than about 0.5% by volume as the fluorinating agent in the initial fluorination of thick walled containers, e.g., 3 mm and greater, while the thermoplastic is at a temperature above the self-supporting temperature of the polymer. For example, a temperature generally varying from about and above 105° to 130° C. would be required for high density polyethylene (HDPE). For thick-walled containers, the fluorine concentration of the initial reactant gas preferably should be about 0.25% to 0.7%; for thin-walled containers the fluorine concentration preferably should be from about 0.7 to 1% by volume. If higher concentrations of fluorine in the reactant gas, e.g. >1%, were injected into the parison while the polymer is above the self-supporting temperature and for extended times, e.g., greater than about 3 seconds, it appears that there is a searing or singeing effect, if you will, caused by the aggressive reaction of fluorine with carbon causing surface damage, leading to increased solvent permeation. Reaction or contact pressures are conventional and range from 2 to 50 bar.

Since the initial fluorine treatment is carried out above the self-supporting temperature of the polymer, it is very important to carefully control the time involved in expanding and conforming the parison to the mold with an inert gas, if such initial step is used. The temperature of the polymer surface is largely dependent on the thickness of the wall, the temperature of the inflating gas and the contact time necessary for expanding and conforming the parison to the mold. For example, thin-walled containers cool rapidly on contact with room temperature inflation gas, thereby permitting the use of higher fluorine concentrations in the reactant gases. Thick-walled containers maintain temperature for a longer period of time and lower fluorine concentrations in the reactant gases are often required because of excessive surface temperatures. In any case, it is important to carefully control the expanding and conforming time in such a way that the initial fluorine treatment on contact with a reactant gas containing a low concentration of fluorine is carried out at a temperature above the self-supporting temperature of the polymer. Contact times range for a reaction period of about 2 to 30 seconds, preferably from about 5 to 20 seconds. Although reaction times can extend for dilute streams beyond 30 seconds, no significant advantages appear to be achieved.

Once the surface of the container is fluorinated and the initial permeability substantially reduced, further fluorination of the surface to achieve the final reduction in permeability and achieve enhanced physical properties is effected. Secondary fluorination of the pre-fluorinated parison is achieved by contacting the surface with a fluorine-containing gas containing from above about 1 to 20% fluorine and preferably from 1 to 10% fluorine by volume and more preferably from about 2 to 6% fluorine by volume of a period of 2 to 30 seconds, preferably a period of 5 to 20 seconds for both the thick and thin-walled containers when the container wall temperature is at an elevated temperature but below the self-supporting temperature. It is treatment of the pre-fluorinated parison with the higher concentration of fluorine in the subsequent reactant gas that causes a second fluorination of the parison to occur, thereby creating a second fluorine-polymer gradient. Because of the initial surface treatment of the polymer via contact with the dilute fluorine-containing gas, contact of the polymer surface with the reactive gas containing the higher concentration of fluorine does not singe or sear the surface and thereby causing surface damage.

Secondary treatment or fluorination of the pre-fluorinated parison can be achieved in more than one step by contacting reactive fluorine containing gases containing 1% and higher fluorine concentration with the surface of thick and thin-walled containers at an elevated temperature. For example, enhanced secondary fluorination can be achieved by utilizing a reactant gas containing 1% and higher fluorine for a period of 1 to 20 seconds, partially releasing the pressure and then undergoing a third or fourth treatment utilizing a reactive fluorine containing gas containing 1% and higher concentrations of fluorine for a period of 1 to 20 seconds. With each secondary fluorine treatment step, enhanced fluorination is achieved and essentially no surface disruption is observed by the reaction of reactant gas having a high concentration of fluorine gas with the thermoplastic polymer.

In a preferred embodiment, solvent permeation resistant containers are made from polyethylene. Initial fluorination of the parison, and preferably at least the first treatment associated with the secondary fluorination, is to be conducted at above the self-supporting temperature of polyethylene. For polyethylene, this temperature will vary from 105° C. to 130° C. and with final temperatures reaching below about 100° C. prior to ejection of the parison from the mold. If more than two fluorination stages are used in the multi-step process, subsequent stages may be carried out at temperatures below the self-supporting temperature.

To summarize, in the multi-stage, in-line process, in contrast to the early methods of fluorination, initial contact of the parison is made with a dilute fluorine containing reactant gas for fluorinating the surface of the parison while the thermoplastic in its softened state and above while it is at a temperature above the self-supporting temperature for limited times. The dilute fluorine-containing reactant gas will have a fluorine concentration not greater than about 1% and preferably not greater than about 0.7 to 0.5% by volume for thick-walled containers and preferably not less than about 0.7 to 1% fluorine for thin-walled containers. Reaction periods of about 2 to 30 seconds, preferably from about 5 to 15 seconds, are employed. Initial surface fluorination at these concentrations effects an initial fluorinated polymer gradient. Secondary fluorination requires a reactant gas having a significantly higher fluorine concentration, typically from 2 to 5% for thick-walled containers and 5 to 10% for thin-walled containers. Contact times range from 2 to 30 seconds, preferably from 5 to 15 seconds for both initial and secondary treatment.

The following examples are provided to illustrate various embodiments of the invention and are not intended to restrict the scope thereof.

COMPARATIVE EXAMPLE 1

Multi-Step Production of Thin-walled Containers from High Density Polyethylene

Cylindrical high density polyethylene (HDPE) thin-walled containers with a nominal wall thickness of 0.9 mm were prepared by the extrusion blow molding process. During the inflation process the containers were pressurized to approximately 100 psig with either an inert nitrogen or a reactive treatment gas containing 1 to 10% fluorine in inert nitrogen for a period of 6 or 12 seconds, after which the pressure was released from the containers for a period of one and one-half seconds to allow the inert nitrogen or reactive gas to escape. The containers were then repressurized to a second time to approximately 100 psig with inert nitrogen for a period of six seconds. After this the pressure was released from the containers for a period of one and one-half seconds to allow inert nitrogen to escape. They were pressurized a third time to approximately 100 psig with inert nitrogen for 6 seconds. Finally, the containers were vented to atmospheric pressure and removed from the mold. According to the above procedure, the containers were treated with fluorine containing gas only in the first step at above the self-supporting temperature of HDPE.

Containers prepared in the above manner were filled with a hydrocarbon solvent mixture consisting of eighty-five percent (85%) toluene and fifteen percent (15%) methanol by volume. The mouths of the filled containers were then heat sealed with foil-backed low density polyethylene film and capped. The sealed containers were stored in an ambient pressure air circulating oven at 50° C. for 28 days, and their weight loss was monitored periodically.

Table 1 indicates the composition of the reactive treatment gas, treatment times and the resultant solvent permeability.

TABLE 1

| Solvent Permeated, Run No. | Treatment Concentration of Fluorine in Nitrogen | | | | | | g/day |
|---|---|---|---|---|---|---|---|
| | Gas 1 | Time | Gas 2 | Time | Gas 3 | Time | |
| 1 | 0% | 6 Secs | 0% | 6 Secs | 0% | 6 Secs | 6.16 |
| 2 | 1% | 12 | 0% | 6 | 0% | 6 | 0.37 |
| 3 | 10% | 6 | 0% | 6 | 0% | 6 | 0.89 |

Run 1 shows, as was known, that HDPE is not resistant to hydrocarbon permeation absent fluorination. Run 2 shows a one-step treatment of HDPE using a reactant gas having a fluorine concentration (1% fluorine in nitrogen) at above the self-supporting temperature of HDPE significantly reduces the solvent permeation, but the solvent permeation value is rather high. Run 3 shows that a one-step treatment of HDPE with high fluorine containing gas (10% fluorine in nitrogen) at above the self-supporting temperature of HDPE is not as desirable as the use of a more dilute reactant gas because it provides HDPE containers with considerably lower resistance to solvent permeation. Although Run 2 provided good results, barrier properties may not meet future requirements.

COMPARATIVE EXAMPLE 2

Multi-Step Production of Thin-Walled Containers from High Density Polyethylene

Cylindrical high density polyethylene (HDPE) thin-walled containers similar to ones described in Example 1 were prepared by the extrusion blow molding process. During the inflation process the containers were pressurized to approximately 100 psig with an inert nitrogen reactant gas for a period of 6 or 12 seconds (Step 1 or Gas 1), after which the pressure was released from the containers for a period of one and one-half seconds to allow the nitrogen gas to escape. The containers then were repressurized a second time to approximately 100 psig with a reactive treatment gas containing 1 or 10% fluorine in inert nitrogen for a period of 6 seconds (Step 2 or Gas 2). After this the pressure was released from the containers for a period of one and one-half seconds to allow reactive gas to escape. The containers were pressurized a third time to approximately 100 psig with a reactive treatment gas containing 1 or 10% fluorine in inert nitrogen for a period of 6 seconds. Finally, the containers were vented to atmospheric pressure, purged with an ambient pressure air stream or an inert gas to remove any traces of reactive treatment gas and removed from the mold. Since the containers were thin-walled, they were quickly cooled from a temperature above the self-supporting temperature to a temperature below the self-supporting temperature of HDPE within a time estimated to be about 2 to 3 seconds by the pressurizing and purging with inert nitrogen gas used in the Step 1 and prior to the reactant gas treatment in Step 2. The containers were, therefore, treated with a fluorine containing gas in multiple steps first at above and then below the self-supporting temperature of HDPE. The solvent permeability of these containers was determined following the procedure similar to the one described in Example 1. Table 2 indicates the composition of the reactive treatment gas, treatment times in seconds and the resultant solvent permeability.

TABLE 2

| Solvent Permeated, Run No. | Treatment Concentration of Fluorine in Nitrogen | | | | | | g/day |
|---|---|---|---|---|---|---|---|
| | Gas 1 | Time | Gas 2 | Time | Gas 3 | Time | |
| 1 | 0% | 6 Secs | 1% | 6 Secs | 1% | 6 Secs | 3.29 |
| 2 | 0% | 12 | 10% | 6 | 10% | 6 | 0.36 |

Run 1 shows that a multi-step treatment of HDPE with low fluorine containing gas (1% fluorine in nitrogen) at below the self-supporting temperature of HDPE marginally improves the resistance to solvent permeation of treated containers. Run 2, on the other hand shows, that a multi-step treatment of HDPE with high fluorine containing gas (10% fluorine in nitrogen) at below the self-supporting temperature of HDPE significantly improves the resistance to solvent permeation of treated containers. The solvent permeation value was very similar to that noted with one-step treatment with low concentration of fluorine at above the self-supporting temperature of HDPE (compare results of Run 2 of Ex 2 with Run 2 of Ex 1). However, the solvent permeation value is still high.

EXAMPLE 3

Multi-Step Production of Thin-walled Containers from High Density Polyethylene

Cylindrical high density polyethylene (HDPE) thin-walled containers similar to ones described in Example 1 were prepared by the extrusion blow molding process. During the inflation process the containers were pressurized to approximately 100 psig with a reactive treatment gas containing 1 or 10% fluorine in inert nitrogen gas for a period of 6 or 12 seconds, after which the pressure was released from the containers for a period of one and one-half seconds to allow the reactive gas to escape. The containers were then repressurized a second time to approximately 100 psig either with an inert nitrogen or a reactive treatment gas containing 10% fluorine in inert nitrogen for a period of 6 seconds. After pressurizing, pressure was released from the containers for a period of one and one-half seconds to allow reactive gas to escape. The containers were pressurized a third time to approximately 100 psig with a reactive treatment gas containing 1 or 10% fluorine in inert nitrogen for a period of 6 seconds. Finally, the containers were vented to atmospheric pressure, purged with an ambient pressure air stream or an inert gas to remove any traces of reactive treatment gas and removed for the mold. Containers were, therefore, treated in the first step with fluorine containing gas at above the self-supporting temperature of HDPE. They were treated further in the second and third steps with fluorine containing gas at below the self-supporting temperature of HDPE.

The solvent permeability of these containers was determined following the procedure similar to the one described in Example 1. Table 3 indicates the composition of the reactive treatment gas, treatment times and the resultant solvent permeability.

TABLE 3

| Solvent Permeated, Run No. | Treatment Concentration of Fluorine in Nitrogen | | | | | | g/day |
|---|---|---|---|---|---|---|---|
| | Gas 1 | Time | Gas 2 | Time | Gas 3 | Time | |
| 1 | 1% | 6 Secs | 0% | 6 Secs | 1% | 6 Secs | 0.55 |
| 2 | 1% | 12 | 10% | 6 | 10% | 6 | 0.22 |

Run 1 shows that a multi-step treatment of HDPE with low fluorine containing gas (1% fluorine in nitrogen) first at above the self-supporting temperature of HDPE and then at a temperature below the self-supporting temperature of HDPE improves the resistance to solvent permeation of the container. Run 2, on the other hand, shows that a multi-step treatment of contacting HDPE with an initial low fluorine containing gas (1% fluorine in nitrogen) at above the self-supporting temperature of HDPE and then contacting with a fluorine containing gas having a higher fluorine concentration than used initially (10% fluorine in nitrogen) at below the self-supporting temperature of HDPE greatly improves the resistance to solvent permeation of the container.

The result of Run 2 suggests that it is desirable to treat HDPE containers at above the self-supporting temperature with low fluorine containing gas first and, then, at some point, contacting HDPE at a temperature below the self-supporting temperature with high fluorine containing gas to significantly reduce solvent permeation of treated containers.

COMPARATIVE EXAMPLE 4

Multi-Step Production of Thick-walled Automobile Fuel Tanks from High Density Polyethylene The procedure of Example 2 was repeated utilizing a multi-step process for the production of thick-walled automobile fuel tanks with a nominal wall thickness of 4.0 mm wherein in the first step an inert nitrogen gas (Gas 1) was used to pressurize and inflate the parison for a period of 9 seconds, after which the pressure was released from the tanks. Because of relatively thick walls of the fuel tanks, the temperature remained above the self-supporting temperature of HDPE. The fuel tanks were treated in the second step with a reactive gas containing 1% fluorine by volume and the balance being nitrogen followed by tertiary treatment with reactive gases containing from 1% to 10% fluorine by volume. The secondary treatment times in the second (Gas 2) and third steps (Gas 3) were for a period of 9 seconds each. The fuel tanks were vented to atmospheric pressure, purged with an ambient pressure air stream or an inert gas to remove any traces of reactive treatment gas and removed from the mold. The tanks were, therefore, treated first with a fluorine containing gas at above the self-supporting temperature of HDPE. They were treated further with a fluorine containing gas at a temperature above or below the self-supporting temperature of HDPE or both above and below.

The hydrocarbon solvent permeability of these fuel tanks was determined following the procedure similar to the one described in Example 1. The hydrocarbon solvent mixture consisting of 92.5% indolene, 5.0% methanol, and 2.5% ethanol by volume was used for determining solvent permeability instead of using a hydrocarbon mixture of eighty-five percent (85%) toluene and fifteen percent (15%) methanol by volume.

Table 4 indicates the composition of the reactive treatment gas, treatment times and the resultant solvent permeability after 8 weeks of storing in an ambient pressure air circulating oven at 40° C.

TABLE 4

| Solvent Permeated, Run No. | Treatment Concentration of Fluorine in Nitrogen | | | | | | g/day |
|---|---|---|---|---|---|---|---|
| | Gas 1 | Time | Gas 2 | Time | Gas 3 | Time | |
| 1 | 0% | 9 Secs | 1% | 9 Secs | 1% | 9 Secs | 0.36 |
| 2 | 0% | 9 | 1% | 9 | 10% | 9 | 0.29 |
| 3 | 0% | 9 | 1% | 9 | 10% | 9 | 0.26 |

The data in Table 4, as with Table 3, again shows that a multi-step treatment of HDPE with low fluorine containing gas (1% fluorine in nitrogen) at above the self-supporting temperature of HDPE first and then with high fluorine containing gas (10% fluorine in nitrogen) initially at above and then ending below the self-supporting temperature of HDPE provides good solvent permeation value for the treated fuel tanks. However, the solvent permeation value is still higher than the desired value. For thick-walled containers such as fuel tanks, it is believed that a 1% and higher initial fluorine concentration may be too high of a concentration, or the contact time may have been too long for the process temperature.

EXAMPLE 5

Multi-Step Production of Automobile Fuel Tanks from High Density Polyethylene

The procedure of Example 4 was repeated for the production of thick-walled automobile fuel tanks wherein in the second step a reactive gas containing 0.5% fluorine by volume and the balance being nitrogen at above the self-supporting temperature of HDPE was used followed by tertiary treatment at above or below the self-supporting temperature of HDPE with reactive gas containing from 0 to 10% fluorine by volume. The treatment times in the second and third steps were for a period of nine seconds each. The fuel tanks were vented to atmospheric pressure, purged with an ambient pressure air stream or an inert gas to remove any traces of reactive treatment gas and removed from the mold. The fuel tanks were, therefore, treated first with a reactant gas containing a low level of fluorine at above the self-supporting temperature of HDPE. They were treated further with high fluorine containing gas at above or below the self-supporting temperature of HDPE.

The solvent permeability of these containers was determined following the procedure similar to the one described in Example 4. Table 5 indicates the composition of the reactive treatment gas, treatment times an the resultant solvent permeability.

TABLE 5

| Solvent Permeated, Run No. | Treatment Concentration of Fluorine in Nitrogen | | | | | | g/day |
|---|---|---|---|---|---|---|---|
| | Gas 1 | Time | Gas 2 | Time | Gas 3 | Time | |
| 1 | 0% | 9 Secs | 0.5% | 9 Secs | 0% | 9 Secs | 0.35 |
| 2 | 0% | 9 | 0.5% | 9 | 0% | 9 | 0.30 |
| 3 | 0% | 9 | 0.5% | 9 | 1% | 9 | 0.18 |
| 4 | 0% | 9 | 0.5% | 9 | 1% | 9 | 0.18 |
| 5 | 0% | 9 | 0.5% | 9 | 2.5% | 9 | 0.08 |
| 6 | 0% | 9 | 0.5% | 9 | 5% | 9 | 0.10 |
| 7 | 0% | 9 | 0.5% | 9 | 5% | 9 | 0.09 |
| 8 | 0% | 9 | 0.5% | 9 | 10% | 9 | 0.21 |
| 9 | 0% | 9 | 0.5% | 9 | 10% | 9 | 0.21 |

Runs 1–2 show enhanced resistance to permeability after an initial one-step treatment with low concentration of fluorine containing inert gas above the self-supporting temperature of the polymer. Runs 3 and 4 show that after initial fluorination, contacting the containers with a gas having a higher fluorine content than otherwise would be acceptable for reducing permeability and improving barrier properties. Runs 8 & 9 show that additional reaction occurs over and beyond that shown in Runs 3–7. Higher permeability of the container, as noted in Runs 8 & 9 vis-a-vis Runs 6 & 7 is attributed to an increase in the polymeric degradation from aggressive, high fluorine concentration treatment, thereby damaging the surface. The institution of a secondary treatment reactant gas having too high a fluorine concentration may lead to reduced permeation relative to that obtained from using a reactant gas having a significantly higher concentration of fluorine (10 fold) from that used initially but less than the 20 fold increase used in Runs 8 & 9. In any case, the use of a reactant gas having a low concentration of fluorine prior to the introduction of reactant gas having the higher concentration permits one to obtain added benefits as illustrated in runs 4–6 of Table 4.

The data in Table 5 clearly show that a multi-step treatment of HDPE with low fluorine containing gas (0.5% fluorine in nitrogen) at above the self-supporting temperature of HDPE first and then with high fluorine containing gas (above 1% fluorine in nitrogen) at above or below the self-supporting temperature of HDPE provides excellent solvent permeation resistance to the treated fuel tanks. The solvent permeation value in some cases was noted to be well below the desired value.

What is claimed is:

1. In a process for the production of a blow molded, permeation resistant thermoplastic article via in-line fluorination wherein a parison of thermoplastic material is formed, expanded within a closed mold by means of an inflation gas for conforming the parison to the shape of the mold and fluorinated at a temperature above its self-supporting temperature under conditions sufficient to effect surface fluorination of the interior of said parison thereby reducing its permeability to hydrocarbon fuels and thereby forming the blow molded, permeation resistant article, the article is then evacuated and recovered, the improvement comprising the steps of:

effecting an initial fluorination by pressurizing the parison while at a temperature above its self-supporting temperature with a reactive fluorine containing gas containing from about 0.1 to 1% fluorine by volume for a time sufficient to effect fluorination of the interior surface of the parison and thereby form a pre-fluorinated parison; and then, subsequently pressurizing the interior surface of the pre-fluorinated parison for effecting secondary fluorination by contacting the interior surface with a reactive fluorine containing gas having a fluorine concentration of at least twice that employed in the initial fluorination but not less than about 1% fluorine by volume, said parison being at an elevated temperature but below the self-supporting temperature during at least part of the secondary fluorination.

2. The process of claim 1 wherein the parison is a thick-walled parison having a nominal thickness of 3 mm greater.

3. The process of claim 2 wherein the pressure during pressurization to form the pre-fluorinated parison is from 2 to 50 bar.

4. The process of claim 2 wherein the concentration of fluorine in the reactive gas used for initial fluorination of the parison is from 0.25 to 0.7% by volume.

5. The procedure of claim 4 wherein the contact time for the initial fluorination is from about 2 to 30 seconds.

6. The process of claim 5 wherein the thermoplastic is high density polyethylene.

7. The process of claim 6 wherein the concentration of fluorine in the reactive gas used for secondary fluorination is from about 1 to 10% by volume.

8. The process of claim 7 wherein the contact time in the secondary fluorination is from 5 t 20 seconds.

9. The process of claim 8 wherein the concentration of fluorine in the reactant gas used for secondary fluorination is from 2 to 5%.

10. The process of claim 2 wherein the parison is formed, expanded, and conformed to the shape of the mold with an inert gas selected from the group consisting of nitrogen, helium and argon.

11. The process of claim 1 wherein the parison is a thin-walled parison having a nominal thickness of 2 mm or less.

12. The process of claim 11 wherein the pressure during pressurization to form the initial fluorinated parison is from 2 to 50 bar.

13. The process of claim 11 wherein the concentration of fluorine in the reactive gas used for initial fluorination of the parison is from 0.5 to 1% by volume.

14. The procedure of claim 13 wherein the contact time for the initial fluorination is from 2 to 30 seconds.

15. The process of claim 14 wherein the thermoplastic is high density polyethylene.

16. The process of claim 15 wherein the concentration of fluorine in the reactive gas used for secondary fluorination is from about 1 to 10% by volume.

17. The process of claim 16 wherein the contact time in the second fluorination is from 5 to 20 seconds.

18. The process of claim 17 wherein the concentration of fluorine in the reactant gas used for secondary fluorination is from 5 to 10%.

* * * * *